Nov. 9, 1965   F. E. BAKER   3,216,284
TRANSMISSION
Filed June 21, 1963   3 Sheets-Sheet 1
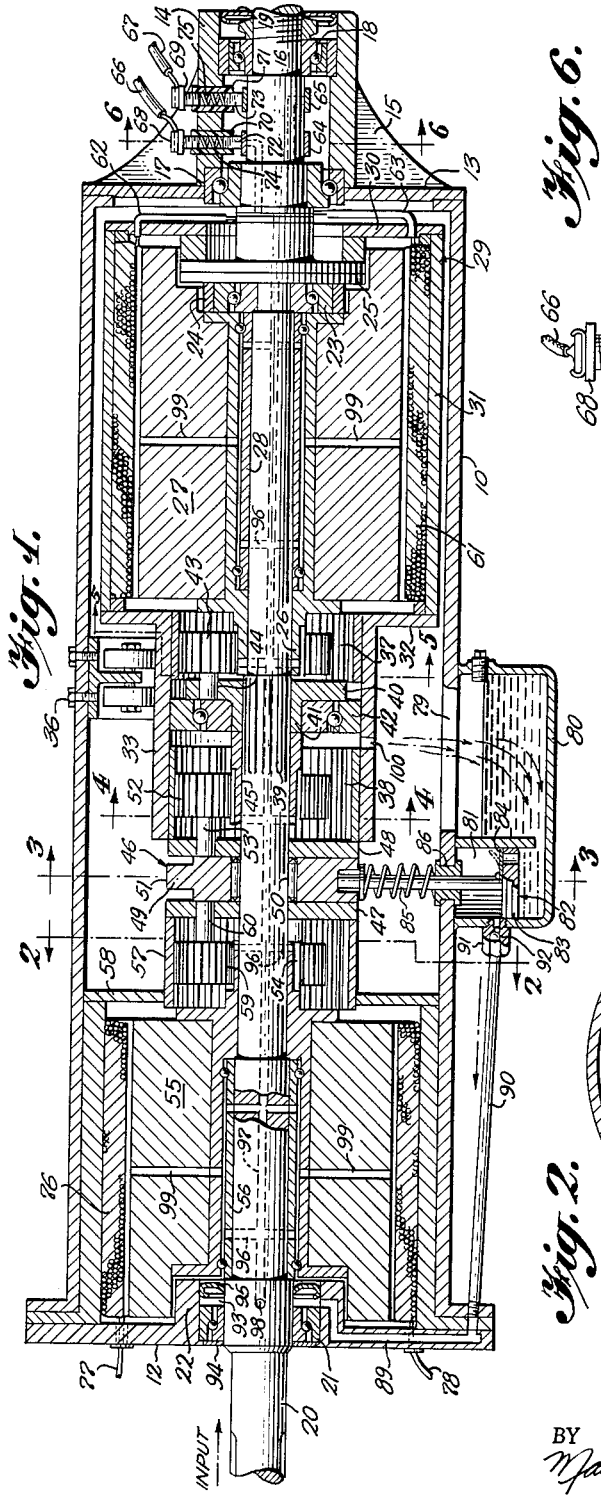
INVENTOR
*Frederick E. Baker*
BY
*Mason, Fenwick & Lawrence*
ATTORNEYS Nov. 9, 1965   F. E. BAKER   3,216,284
TRANSMISSION Filed June 21, 1963   3 Sheets-Sheet 2

INVENTOR
*Frederick E. Baker*

BY
*Mason, Fenwick & Lawrence*
ATTORNEY

Nov. 9, 1965  F. E. BAKER  3,216,284
TRANSMISSION
Filed June 21, 1963  3 Sheets-Sheet 3

INVENTOR
*Frederick E. Baker*

BY *Mason, Fenwick & Lawrence*
ATTORNEYS

United States Patent Office 3,216,284
Patented Nov. 9, 1965

3,216,284
TRANSMISSION
Frederick E. Baker, Ridgefield, Wash., assignor to Baker Development Corporation, a corporation of Washington
Filed June 21, 1963, Ser. No. 289,631
12 Claims. (Cl. 74—759)

This invention relates to a power transmission means and more particularly to a variable speed transmission suitable for automotive vehicles and the like. This invention also contemplates a transmission which can be utilized as a constant speed device.

In the prior art, there are many types of variable speed transmissions utilizing mechanical components in combination with fluid and electromagnetic components to provide a variety of devices having different operating characteristics. Such devices, however, usually involve complicated structures and it has been desirable to provide an improved variable speed transmission operable in forward and reverse drive, which is comparatively simple in construction and operation.

Accordingly, it is the principal object of this invention to provide an improved variable speed transmission.

It is another object of this invention to provide an improve electromechanical, variable speed transmission which will provide instantaneous response to changes in speed of the driver means.

A further object of this invention is to provide an improved variable speed transmission having gearing components which remain in mesh at all times during change in speed or in direction of drive.

A still further object of this invention is to provide an improved variable speed transmission having stepless speed variation in forward drive.

Another object of this invention is to provide an improved electromechanical, variable speed transmission wherein speed and direction of drive may be electrically controlled.

A further object of this invention is to provide an improved variable speed transmission which under conditions of maximum torque transmission, provides a direct drive coupling between the driver and driven means thereof.

A still further object of this invention is to provide an improved variable speed transmission, having means for delivering maximum obtainable torque at low speeds.

Another object of this invention is to provide an improved variable speed transmission which is simple to construct and operate.

Other objects and advantages of the invention will become apparent to those skilled in the art, from the following description taken in conjunction with the accompanying drawings, wherein:

FIGURE 1 is an elevational cross-section of a first embodiment of the invention;

FIGURE 2 is a cross-sectional view taken along lines 2—2 of FIGURE 1;

FIGURE 6 is an enlarged cross-sectional view taken along line 6—6 of FIGURE 1;

Figure 3:
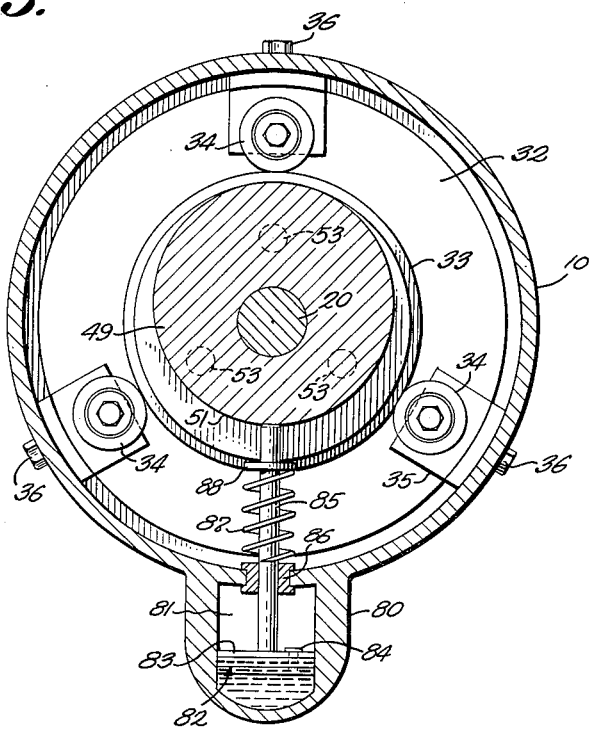
FIGURE 3 is an enlarged cross-sectional view taken along line 3—3 of FIGURE 1.

In accordance with the broad aspects of this invention, there is provided a transmission device having a plurality of epicyclic or planetary gear train systems mounted on aligned input and output shafts. The components of the systems are operatively interconnected so that when the rotation of selected components is impeded, the systems will react to drive the output shaft at predetermined speeds and directions. A plurality of means is provided which may be selectively operated to impede the rotation of the selected components of the gear train systems to produce the desired reactions.

Referring to FIGURE 1, there is shown a first embodiment of the present invention comprising a cylindrical housing 10, having a front end plate 12 and a rear end plate 13. Coaxially mounted on the rear end plate 13 is a cylindrical housing member 14 having a smaller diameter relative to the housing 10, which is provided with a plurality of circumferentially spaced reinforcing webs 15. Axially disposed in the housing 10 and extending through the housing 14 is an output shaft 16 journalled in a bearing 17 mounted in an axial opening in the rear end wall 13, and a bearing 18 mounted at the rearward end of the housing member 14. The rearward end of the housing member 14 is provided with an oil seal 19 disposed in sealing relation with the output shaft 16. Extending into the housing 10 through an opening in the front end plate 12 is an axially disposed input shaft 20 journalled at its forward end in a bearing 21 mounted within the opening in the front end plate, partly in an inwardly extending annular flange portion 22 of the front end plate, and in a bearing 23 mounted in an annular flange 24 of an end plate 25 formed on the forward end of the output shaft 16. It will be noted that the input shaft is journalled in the output shaft in axial alignment therewith.

Rotatably mounted on the input shaft 20 is a sun gear 26 having an inner rotor 27 formed integral therewith, which also is rotatably mounted on a sleeve bearing 28 on the rearward end of the input shaft. Integrally connected to the end plate 25 for rotation with the output shaft 16 is an outer rotor 29 comprising an annular portion 30 rigidly connected to the end plate 25 of the output shaft, a cylindrical portion 31 surrounding the inner rotor 27 to provide an annular space therebetween, an annular portion 32 disposed on the forward end of the cylindrical portion 31, and a forwardly projecting cylindrical portion 33 having a diameter smaller than the cylindrical portion 31, disposed coaxially relative to the input shaft. As best shown in FIGURES 1 and 3, the cylindrical portion 33 of the outer rotor 29 is supported by a plurality of rollers 34 having their shafts journalled in circumferentially spaced brackets 35, which are secured by means of bolts 36 to the interior of the housing 10.

Figure 5:
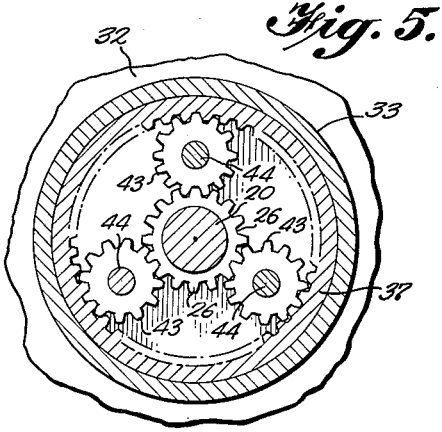
FIGURE 5 is an enlarged cross-sectional view taken along line 5—5 of FIGURE 1.

Mounted within the cylindrical portion 33 of the outer rotor 29 for rotation therewith is a rearwardly disposed ring gear 37 and a forwardly disposed ring gear 38, each of which is disposed coaxially relative to the input shaft. Mounted forwardly of the ring gear member 37 on a splined portion 39 of the input shaft 20 for rotation therewith is a mounting plate 40 having a hub portion 41 journalled in a bearing 42 which is mounted within the cylindrical portion 33 of the outer rotor 29. A plurality of planetary gears 43 each having a stub shaft 44 journalled in the mounting plate 40 mesh with sun gear 26 and ring gear 37 defining a first planetary gear train system as best shown in FIGURE 5, preferably having a 3.5 to 1 or higher gear ratio. Also mounted on the splined portion 39 of the input shaft forwardly of the mounting plate 40 is a sun gear 45.

Figure 4:
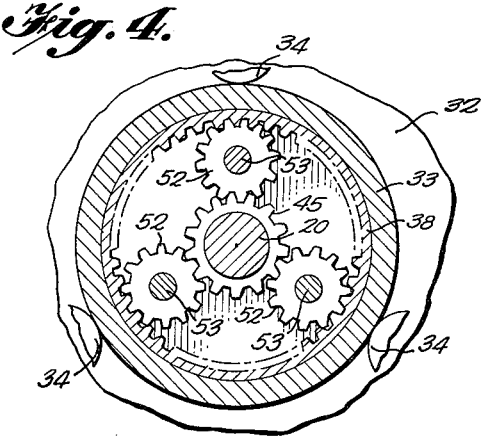
FIGURE 4 is an enlarged cross-sectional view taken along line 4—4 of FIGURE 1.

Rotatably mounted on the input shaft forwardly of the cylindrical portion 33 is a mounting member 46 comprising a pair of spaced mounting plates 47 and 48, and an intermediate cam plate 49 mounted on needle bearings 50 and having an eccentric camming surface 51. Meshing with sun gear 45 and ring gear 38 is a plurality of planetary gears 52, each mounted on a stub shaft 53 which is journalled in mounting plate 48 defining a second planetary gear train system as illustrated in FIGURE 4, preferably having a 3.5 to 1 or higher gear ratio.

Mounted for rotation on the input shaft forwardly of the mounting member 46 is a sun gear 54 having a forwardly extending inner rotor 55 formed integral therewith and rotatably mounted on a sleeve bearing 56 which is mounted on the forward end of the input shaft. Coaxially disposed relative to the sun gear 54 is a ring gear 57 which is rigidly mounted in a transverse wall 58 secured to the housing 10. Meshing with the sun gear 54 and the stationary ring gear 57 is a plurality of planetary gears 59, each mounted on a stu bshaft 69ETAOI are journalled in the mounting plate 47, defining a third planetary gear train system as shown in FIGURE 2, preferably having a 3.5 to 1 or higher gear ratio.

The interior surface of the cylindrical portion 31 of the outer rotor 29 is provided with a plurality of electromagnetic elements 61, which are disposed in electromagnetic coupling relation with the inner rotor 27 which is preferably constructed of silicon steel or any other magnetizable material. The electromagnetic elements 61 are rigidly secured to the cylindrical portion 31 for rotation therewith and are energized by means of electrical leads 62 and 63, which are electrically connected to slip rings 64 and 65 mounted on the rearward portion of the output shaft 16 within the cylindrical housing 14. Electrical current is supplied to the slip rings by means of electrical leads 66 and 67, which are electrically connected to terminal elements 68 and 69, respectively. The terminal elements are threaded in insulating bushing members 70 and 71 disposed in suitable openings in the housing member 14. Electrical current is supplied to the slip rings 64 and 65 by means of contact elements 72 and 73 having suitable springs 74 and 75 disposed between respectivel terminal and contact elements.

Rigidly secured to the interior of the forward end of the housing member 10 is a plurality of electromagnetic elements 76 which are disposed in electromagnetic coupling relation with the rotor 55. Electrical current is supplied to the elements 76 by means of electrical leads 77 and 78. The electrical supply leads 66 and 67 for the elements 61 and the electrical leads 77 and 78 for the elements 76 are connected to a suitable electrical supply source having control means for selectively energizing either of the electromagnetic elements 61 and 76.

The electromagnetic elements 61 are arranged in the interior wall of the cylindrical portion 31 so that when the elements are energized a magnetic field is produced which penetrates the inner rotor 27. Accordingly, the magnetic field produced by the elements causes the outer rotor to be attracted to the inner rotor and to rotate therewith at a speed determined by the strength of the magnetic field. The electromagnetic elements 76 are arranged on the interior wall of the housing 10 so that when the elements are energized a magnetic field is produced which penetrates the rotor 55 impending its rotation. It will be appreciated that the speed of the rotor 55 can be varied by adjusting the strength of the magnetic field produced by the elements 76.

The bottom portion of the housing member 10 is provided with an opening 79, which communicates with a lubricant reservoir 80 formed integral with the housing member. Provided within the reservoir 80 is a radially disposed pumping chamber 81 communicating at its lower end with the interior of the reservoir 80. Slidably mounted in the pump chamber 81 is a plunger 82 comprising a head portion 83 slidably disposed within the chamber, having a one-way flapper valve 84 and a stem portion 85 extending through an opening in the housing 10, having a busing 86, and engaging the cam surface 51 of the cam plate 49, as best show in FIGURE 3. The stem portion 85 of the plunger is provided with a helical spring 87 disposed between the bushing member 86 and a collar portion 88 at the upper end of the stem to urge the upper end of the stem into engagement with the cam surface 61.

Intercommunicating with the upper portion of the pump chamber 81 and internal passageway 89 in the front end plate 12 is a lubricant supply line 90 which is connected to the pump chamber 81 by means of a suitable fitting 91 having a check ball valve 92. The passageway 89 communicates with an annular recess 93 surrounding the forward end of the input shaft 20, which contains the bearing 21 and is sealed from the exterior by means of an oil seal 94 and the interior of the housing by means of an oil seal 95. The various members rotatably mounted on the input shaft 20 and the gearing components of the planetary gear train systems are lubricated by means of a plurality of radial passageways 96 which communicate with an axial passageway 97 in the input shaft 20. The lubricant is supplied to the axial passageway in the input shaft by means of a radially disposed passageway 98 disposed at the forward end of the input shaft and communicating with the annular recess 93. The cylindrical rotor members 27 and 55 are each provided with a plurality of radial passageways 99 for transmitting lubricant from the annular space between the sleeve bearings thereof and the rotor members to the annular space between the rotor members and the respective electromagnetic elements for cooling such elements. The cylindrical portion 33 of the outer rotor 29 is provided with a plurality of drainage passageways 100, which permits the lubricant to be returned to the lubricant reservoir 80.

In operating the transmission in forward drive, drive is applied to the input shaft 20 which is transmitted through a spline connection to the mounting plate member 40, causing planetary gears 43 to orbit in a clockwise direction. Simultaneously, the sun gear 26 in mesh with the planetary gears 43 is caused to rotate in a clockwise direction while the outer rotor remains in the static position as a result of the load applied to the output shaft. At this point, electrical current is applied to the electromagnetic elements 61 through the slip ring arrangement as previously described, to produce a magnetic field which is induced into the rotor 27 thereby electromagnetically coupling the outer rotor 29 to the inner rotor 27. As previously described, the magnetic field produced in the elements 61 produces a drag on the rotor 27 causing the rotor 29 to rotate with rotor 27. By increasing the strength of the magnetic field, the slippage between the inner rotor 27 and the outer rotor 29 decreases, impeding the rotation of the rotor member 27 so that the planetary gears 43 are caused to react to rotate the outer rotor 31 and the output shaft 16 in the same direction as the input shaft. Eventually, when the slippage between the inner rotor 27 and the outer rotor 29 is reduced substantially to zero, the rotor members become electromagnetically locked and torque is transmitted from the input shaft 20 through the planetary gears 43 to the outer rotor member 29 and the output shaft 16, to provide substantially a direct drive coupling between the input and output shafts. It will be appreciated that by controlling the current applied to the elements 61, rigidly mounted on the cylindrical portion 31 of the outer rotor member 29, the amount of torque transmitted from the output shaft to the input shaft can be controlled correspondingly.

The drive applied to the input shaft also is transmitted through the spline connection of the shaft with the sun gear 45, which causes the planetary gears 52 and 59 to orbit in a clockwise direction, thereby causing the rotor 55 by means of the sun gear 54 also to rotate in a clockwise direction. In order to drive the output shaft 16 in the reverse direction, the elements 61 are deenergized and the elements 76 are energized, so that a magnetic field is produced which is induced into the rotor 55, providing an electromagnetic coupling, thereby impeding its rotation and the rotation of the sun gear 54. Simultaneously, the orbiting motion of the planetary gears 59 and 52 is impeded, whereby torque is transmitted directly from the input shaft 20 through the sun gear 45, the non-orbiting planetary gears 52, and the outer rotor 29, to drive the output shaft in an opposite or counterclockwise direction. It will be appreciated that the elements 76 also can be energized during forward drive to provide a braking action.

The orbiting action of the planetary gears 59 and 52 causes the camming plate 49 to rotate, thus transmitting reciprocating motion to the plunger 82. It will be seen that the reciprocating motion of the plunger will cause lubricant in reservoir 80 to be pumped through supply line 90, internal passageway 89 and passageways 97 and 96 to lubricate the various members of the transmission. Lubricant also is supplied by means of the radial passageways 99 in the rotor 55 and 27 to cool the elements 76 and 61 which are suitably insulated.

Figure 7:
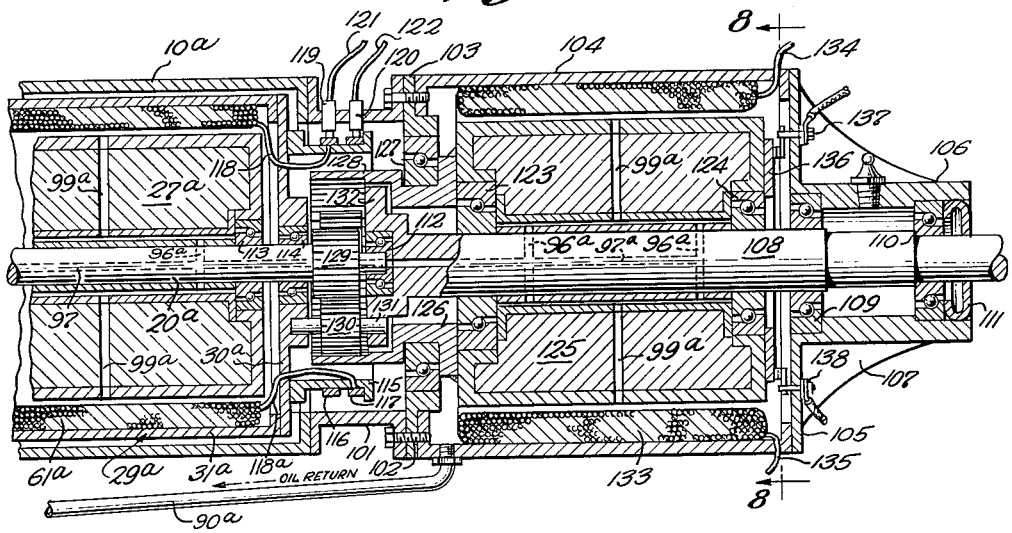
FIGURE 7 is an elevational cross-sectional view of a second embodiment of the invention, having a portion thereof broken away.
Figure 8:
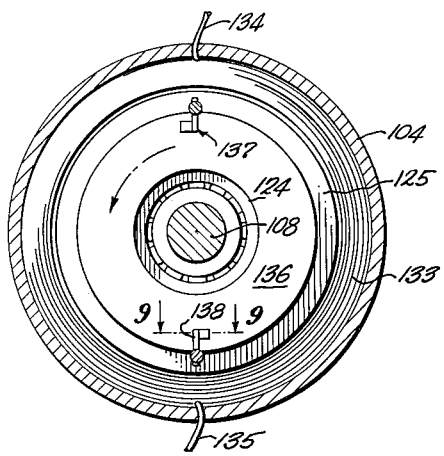
FIGURE 8 is a cross-sectional view taken along line 8—8 of FIGURE 7.
Figure 9:
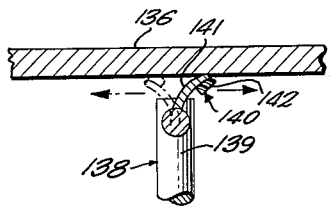
FIGURE 9 is an enlarged cross-sectional view taken along line 9—9 of FIGURE 8.

Referring to FIGURES 7 through 9, there is shown a second embodiment of the invention which incorporates essentially the same construction shown in FIGURES 1 through 6, with some modification, and which provides a supplemental forward drive unit which is operable to deliver additional torque at low output speeds. The transmission device shown in FIGURE 1 is modified, as shown in FIGURE 7, so that a cylindrical mounting member 101 is rigidly secured in the rear end thereof. Rigidly secured to the cylindrical mounting member 101 by means of a plurality of bolts 102 is an annular mounting plate 103 and cylindrical housing member 104. The rearward end of the housing member 104 is closed by means of an end plate 105, provided with a coaxially disposed housing member 106 having a plurality of circumferentially spaced reinforcing webs 107. Disposed within the housing member 104 is an output shaft 108 which is journalled at its rearward end in bearings 109 and 110 mounted in the housing member 106. The rearward end of the housing member 106 is closed by an oil seal 111. The input shaft 20a corresponding to the input shaft 20, as described in connection with the first embodiment, extends through the housing 10a and is journalled at its rearward end in a bearing 112 mounted in a recess in the output shaft 108 so that the input shaft 20a and the output shaft 108 are axially aligned. The rearward end of the rotor 27a corresponding to the inner rotor 27 in FIGURE 1 is rotatably mounted on a bearing 113 disposed on the shaft 20a. The outer rotor 29a, corresponding to outer rotor member 29 in FIGURE 1, comprises a cylindrical portion 31a and an annular end plate member 30a which is rotatably mounted on a bearing 114 mounted on the shaft 20a. Mounted on the end plate portion 30a of the outer rotor member 29a and extending into the cylindrical mounting member 101 is a mounting cylinder 115, having slip rings 116 and 117. The slip rings each are provided with electrical leads 118 and 118a which are electrically connected to the electromagnetic elements 61a disposed on the interior surface of the cylinder portion 31a of the outer rotor member 29a. Electrical current is supplied to the slip rings 116 and 117 by means of brush elements 119 and 120, respectively, having suitable electrical leads 121 and 122.

Rotatably mounted within the housing 104 on bearings 123 and 124 mounted on the output shaft 108 is a rotor 125. Secured to the forward end of the rotor member 125 and rotatable therewith is a coaxially disposed cylindrical member 126 journaled in a bearing 127 mounted in the mounting plate 103, which is provided with a forwardly extending, coaxially disposed ring gear 128 formed integral therewith. Mounted on the end of the input shaft 20a adjacent the front end of the output shaft 108 is a sun gear 129. Meshing with the sun gear 129 and the ring gear 128 is a plurality of planetary gears 130 having stub shafts 131 journaled in the end plate portion 30a of outer rotor member 29a and an annular flange portion 132 formed on the forward end of the output shaft 108 so that the outer rotor member 29a and the output shaft 108 rotate as an integral unit.

Secured to the interior surface of the housing member 104 is a plurality of circumferentially disposed electromagnetic elements 133 having electrical leads 134 and 135. The elements 133 are energized, when the rotor 125 is rotating in the counterclockwise direction relative to FIGURE 8, which is sensed by a direction sensing assembly comprising an electrically conducting plate 136 mounted on the rear end of the rotor 125 and suitably insulated therefrom, and direction sensing switches 137 and 138 mounted in the end wall member 105 and engaging the annular electrical conducting plate 136. As best shown in FIGURES 8 and 9, the direction sensing switches 137 comprise a support arm member 139 having a contact element 140 with a conducting side 141 and a nonconducting side 142 which may be flexed by the annular member 136 to make or break the current supply for the electrical elements 133, depending on the direction of rotation.

The supplemental drive unit illustrated in FIGURE 7 is operable only at lower output speeds to deliver additional torque to the output shaft. By virtue of the fact that the rotor 125 of the supplemental forward drive unit is driven by the ring gear 128 as compared to the rotor 27a which is driven by a sun gear similar to sun gear 26 shown in FIGURE 1, the rotor 125 initially will rotate at a lower speed than the rotor 27a. Initially electrical current is applied to the elements 61a and 133 through their respective electrical leads to produce magnetic fields which are induced into their respective rotors. Drive is applied to the input shaft 20a causing it to rotate in a clockwise direction which is transmitted through the sun gear 129 and the planetary gears 130 to cause ring gear 128 and the rotor 125 to rotate in a counterclockwise direction. When the rotor 125 is rotating in a counterclockwise direction, as noted in FIGURE 8, the contact elements 140 will be flexed so that the conducting sides 141 contact the annular conducting plate 136 to close the electrical supply circuit for the electromagnetic elements 133. The magnetic field produced by the elements 133 impedes the rotation of the rotor 125 and the ring gear 128 so that drive transmitted from the input shaft 20a through sun gear 129 to the planetary gears 130 causes the planetary gears to orbit in a clockwise direction to drive the output shaft 108. As soon as the rotation of the outer rotor 29a in a clockwise direction reaches a predetermined speed determined by the electromagnetic coupling of the inner rotor 27a and the outer rotor 29a, the rotor 125 will be caused to rotate in a clockwise direction thereby causing the contact elements 140 to flex so that the non-conducting side 142 contacts the annular conducting plate 136 to break the electrical supply circuit for the elements 133. At this point the output shaft 108 is driven exclusively by the outer rotor 29a by means of the stub shafts 131 and the rotor 125 is permitted to freewheel.

It has been found that prior to locking conditions between inner rotor 27a and outer rotor 29a, alternating current is induced in the inner rotor 27a as a result of its rotation in the electromagnetic field generated by the electromagnetic elements 61a. The magnitude of this alternating current is proportional to the amount of slippage between the inner rotor 27a and outer rotor 29a, having a maximum value at maximum slippage and minimum value when the rotors are magnetically locked. It is possible to tap such current induced in the inner rotor 27a and convert the same to direct current which may be utilized for energizing the electromagnetic elements 133 in lieu of a separate electrical supply source having the directional sensing switch assembly as described. It will be appreciated by such an arrangement that the electromagnetic elements 133 will be energized in proportion to the amount of slippage between the inner rotor 27a and the outer rotor 29a so that as the slippage decreases, the magnitude of the electrical current supplied to the electromagnetic elements 133 will decrease correspondingly.

The several embodiments of the present invention hereinbefore described may also be employed as constant speed devices by regulating the energization of the electromagnetic coupling elements in response to fluctuations of input speed to provide a constant output speed.

While but several preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A transmission comprising a housing, a first shaft journalled in said housing, a second shaft journalled in said housing in axial alignment with said first shaft, a first rotor rotatably mounted on at least one of said shafts, a first sun gear rotatably mounted on said second shaft formed integral with said first rotor, a second rotor having a portion surrounding said first rotor mounted on said first shaft, one of said first and second rotors having first electromagnetic induction means disposed thereon in electromagnetic coupling relation with the other of said first and second rotors, at least one rotatable ring gear formed integral with said second rotor disposed coaxially with said second shaft, a first mounting plate mounted on said second shaft, a first plurality of planetary gears having shafts journalled in said first mounting plate and meshing with said first sun gear and one of said rotatable ring gears, a second sun gear mounted on said second shaft, a second mounting plate rotatably mounted on said second shaft, a second plurality of planetary gears having shafts journalled in said second mounting plate and meshing with said second sun gear and one of said rotatable ring gears, a third rotor rotatably mounted on said second shaft, a third sun gear rotatably mounted on said second shaft and formed integral with said third rotor, a stationary ring gear mounted on said housing disposed coaxially with said second shaft, a third plurality of planetary gears having shafts journalled in said second mounting plate and meshing with said third sun gear and said stationary ring gear, one of said housing and said third rotor having a second electromagnetic induction means disposed in electromagnetic coupling relation with the other of said housing and said third rotor member and means for supplying electrical current for said first and second electromagnetic induction means.

2. A transmission comprising a housing, a first shaft journalled in said housing, a second shaft journalled in said housing in axial alignment with said first shaft, a first rotor rotatably mounted on at least one of said shafts, a sun gear rotatably mounted on said second shaft formed integral with said first rotor, a second rotor having a portion surrounding said first rotor mounted on said first shaft, said second rotor having first electromagnetic induction means disposed in electromagnetic coupling relation with said first rotor, at least one rotatable ring gear formed integral with said second rotor disposed coaxially with said second shaft, a first mounting plate mounted on said second shaft, a first plurality of planetary gears having shafts journalled in said first mounting plate and meshing with said first sun gear and one of said rotatable ring gears, a second sun gear mounted on said second shaft, a second mounting plate rotatably mounted on said second shaft, a second plurality of planetary gears having shafts journalled in said second mounting plate and meshing with said second sun gear and one of said rotatable ring gears, a third rotor rotatably mounted on said second shaft, a third sun gear rotatably mounted on said second shaft and formed integral with said third rotor, a stationary ring gear mounted on said housing disposed coaxially with said second shaft, a third plurality of planetary gears having shafts journalled in said second mounting plate and meshing with said third sun gear and said stationary ring gear, said transmission having a second electromagnetic induction means disposed in electromagnetic coupling relation with said third rotor and means for supplying electrical current for said first and second electromagnetic induction means.

3. A transmission comprising a housing, a first shaft journalled in said housing, a second shaft journalled in said housing and said first shaft in axial alignment therewith, a first rotor rotatably mounted on said second shaft, a first sun gear rotatably mounted on said second shaft formed integral with said first rotor, a second rotor having a portion surrounding said first rotor mounted on said first shaft, said second rotor having a first electromagnetic induction means disposed in electromagnetic coupling relation with said first rotor, first and second ring gears mounted on said second rotor disposed coaxially with said second shaft, a first mounting plate mounted on said second shaft, a first plurality of planetary gears having shafts journalled in said first mounting plate and meshing with said first sun gear and said first ring gear, a second sun gear mounted on said second shaft, a second mounting plate rotatably mounted on said second shaft, a second plurality of planetary gears having shafts journalled in said second mounting plate and meshing with said second sun gear and said second ring gear, a third rotor rotatably mounted on said second shaft, a third sun gear mounted on said shaft and formed integral with said third rotor, a third ring gear mounted on said housing disposed coaxially with said second shaft, a third plurality of planetary gears having shafts journalled in said second mounting plate and meshing with said third sun gear and said third ring gear, said housing having a second electromagnetic induction means disposed in electromagnetic coupling relation with said third rotor and means for supplying electrical current for said first and second electromagnetic induction means.

4. A transmission comprising a housing, a first shaft journalled in said housing, a second shaft journalled in said housing and said first shaft in axial alignment therewith, a first rotor rotatably mounted on said second shaft, a first sun gear rotatably mounted on said second shaft formed integral with said first rotor, a second rotor having a portion surrounding said first rotor mounted on said first shaft, said second rotor having a first electromagnetic induction means disposed in electromagnetic coupling relation with said first rotor, first and second ring gears mounted on said second rotor disposed coaxially with said second shaft, a first mounting plate mounted on said second shaft, a first plurality of planetary gears having shafts journalled in said first mounting plate and meshing with said first sun gear and said first ring gear, a second sun gear mounted on said second shaft, a second mounting plate rotatably mounted on said second shaft, a second plurality of planetary gears having shafts journalled in said second mounting plate and meshing with said second sun gear and said second ring gear, a third rotor rotatably mounted on said second shaft, a third sun gear rotatably mounted on said shaft and formed integral with said third rotor, a third ring gear mounted on said housing disposed coaxially with said second shaft, a third plurality of planetary gears having shafts journalled in said second mounting plate and meshing with said third sun gear and said third ring gear, said housing having a second electromagnetic coupling relation with said third rotor, means for supplying electrical current for said first and second electromagnetic induction means, a lubricant reservoir means, means for transmitting lubricant from said reservoir means to said rotor members and said gear members and means for pumping said lubricant from said reservoir means through said transmitting means.

5. A transmission comprising a housing, a first shaft journalled in said housing, a second shaft journalled in said housing and said first shaft in axial alignment therewith, a first cylindrical rotor rotatably mounted on said second shaft, a first gun gear rotatably mounted on said second shaft formed integral with said first cylindrical rotor, a second rotor having a cylindrical portion surrounding said first cylindrical rotor mounted on said first shaft, said second rotor having a first electromagnetic induction means disposed on the cylindrical portion thereof in electromagnetic coupling relation with said first cylindrical rotor, first and second ring gears mounted on said second rotor disposed coaxially with said second shaft, a first mounting plate mounted on said second shaft, a first plurality of planetary gears having shafts journalled in said first mounting plate and meshing with said first sun gear and said first ring gear, a second sun gear mounted on said second shaft, a second mounting plate rotatably mounted on said second shaft, a second plurality of planetary gears having shafts journalled in said second mounting plate and meshing with said second sun gear and said second ring gear, a third cylindrical rotor rotatably mounted on said second shaft, a third sun gear rotatably mounted on said shaft and formed integral with said third rotor, a third ring gear on said housing disposed coaxially with said second shaft, a third plurality of planetary gears having shafts journalled in said second mounting plate and meshing with said third sun gear and said third ring gear, said housing having a second electromagnet induction means disposed in electromagnetic coupling relation with said third cylindrical rotor, means for supplying electrical current for said first and second electromagnetic induction means, said housing having a lubricant reservoir compartment communicating with the interior of said housing, said second mounting plate having an eccentric camming surface relative to the axis of said second shaft, said reservoir compartment having a pumping chamber, a plunger having a head portion slidably disposed in said pumping chamber and a stem portion extending through a suitable opening in said housing with the end thereof engageable with said cam surface on said second mounting plate, means disposed on said housing for biasing said stem portion of said plunger into engagement with said cam surface, said head portion of said plunger having a one-way flapper valve, said second shaft having passageway intercommunicating with said rotors and said gears and said transmission having fluid supply means interconnecting with said pump chamber and said passageways in said second shaft.

6. A transmission comprising a housing, a first shaft journalled in said housing, a second shaft journalled in said housing and said first shaft in axial alignment therewith, first, second and third planetary gear train systems each comprising a sun gear, a ring gear and a plurality of planetary gears, the sun gear of said first gear train system being rotatably mounted on said second shaft and having a first rotor formed integral therewith rotatably mounted on said second shaft, the ring gear of said first system being disposed coaxially relative to said second shaft and having a second rotor formed integral therewith mounted on said first shaft, electromagnetic induction means disposed on said second rotor in electromagnetic coupling relation with said first rotor, the planetary gears of said first system having shafts journalled in a mounting plate mounted on said second shaft for rotation therewith, the sun gear of said second system being mounted on said second shaft for rotation therewith, the ring gear of said second system being disposed coaxially with said second shaft and formed integral with the ring gear of said first system for rotation therewith, the planetary gears of said second system having shafts journalled on a mounting plate rotatably mounted on said second shaft, the sun gear of said third system being rotatably mounted on said second shaft and having a third rotor formed integral therewith rotatably mounted on said second shaft, the ring gear of said third system being coaxially disposed relative to said second shaft and mounted on said housing, the planetary gears of said third system having shafts journalled in the same mounting plate as the planetary gears of said second system, second electromagnetic induction means mounted on said housing disposed in electromagnetic coupling relation with said third rotor member and means for supplying electrical current for said first and second electromagnetic induction means.

7. A transmission comprising a housing, an output shaft journalled in said housing, an input shaft journalled in said housing and said output shaft in axial alignment therewith, a first rotor rotatably mounted on said input shaft, said first rotor having a hub portion defining a first sun gear, a second rotor mounted on said ouput shaft, said second rotor having first and second cylindrical elements disposed coaxially relative to said input shaft, first electromagnetic induction means disposed on said first cylindrical element of said second rotor in electromagnetic coupling relation with said first rotor, first and second ring gears mounted on said second cylindrical element of said second rotor, a first mounting plate mounted on said input shaft, a first plurality of planetary gears having shafts journalled in said first mounting plate and meshing with said first ring gear of said second rotor and said first sun gear, a second sun gear mounted on said input shaft, a second mounting plate rotatably mounted on said input shaft, a second plurality of planetary gears journalled in said second mounting plate and meshing with said second ring gear of said second rotor and said second sun gear, a third rotor having a hub portion defining a third sun gear rotatably mounted on said input shaft, second electromagnetic induction means disposed on said housing in electromagnetic coupling relation to said third rotor, a third ring gear mounted on said housing disposed coaxially relative to said input shaft, a third plurality of planetary gears journalled in said mounting plate and meshing with said third sun gear and said third ring gear and means for supplying electrical current for said first and second electromagnetic induction means.

8. A transmission comprising a housing, a first shaft journalled in said housing, a second shaft journalled in said housing in axial alignment with said first shaft, a first rotor rotatably mounted on said second shaft, a first sun gear rotatably mounted on said second shaft formed integral with said first rotor, a second rotor having a portion surrounding said first rotor rotatably mounted on said first shaft, one of said first and second rotors having first electromagnetic induction means disposed in electromagnetic coupling relation with the other of said first and second rotors, at least one rotatable ring gear formed integral with said second rotor disposed coaxially with said second shaft, a first mounting plate mounted on said second shaft, a first plurality of planetary gears having shafts journalled in said first mounting plate, meshing with said first sun gear and one of said rotatable ring gears, a second sun gear mounted on said second shaft, a second plurality of planetary gears having shafts journalled in said second mounting plate, meshing with said second sun gear and one of said rotatable ring gears, a third rotor rotatably mounted on said second shaft, a third sun gear rotatably mounted on said second shaft and formed integral with said third rotor, a stationary ring gear mounted on said housing disposed coaxially with said second shaft, a third plurality of planetary gears having shafts journalled in said second mounting plate, meshing with said third sun gear and said stationary ring gear, one of said housing and said third rotor having a second electromagnetic induction means disposed in electromagnetic coupling relation with the other of said housing and third rotor, a fourth rotor rotatably mounted on said first shaft, a rotatable ring gear formed integral with said fourth rotor disposed coaxially with said second shaft, a fourth sun gear mounted on said second shaft, a fourth plurality of planetary gears having shafts journalled in said second rotor and said first shaft, meshing with said fourth sun gear and said rotatable ring gear formed integral with said fourth rotor, third electromagnetic induction means disposed on one of said housing and said fourth rotor in electromagnetic coupling relation with the other of said housing and said fourth rotor and means for supplying electrical current for said first second and third electromagnetic induction means.

9. A transmission comprising a housing, a first shaft journalled in said housing, a second shaft journalled in said housing in axial alignment with said first shaft, a first rotor rotatably mounted on said second shaft, a sun gear rotatably mounted on said second shaft formed integral with said first rotor, a second rotor having a portion surrounding said first rotor rotatably mounted on said first shaft, first electromagnetic induction means disposed on said second rotor in electromagnetic coupling relation with said first rotor, at least one rotatable ring gear formed integral with said second rotor disposed coaxially with said second shaft, a first mounting plate mounted on said second shaft, a first plurality of planetary gears having shafts journalled in said first mounting plate meshing with said first sun gear and one of said rotatable ring gears, a second sun gear mounted on said second shaft, a second mounting plate rotatably mounted on said second shaft, a second plurality of planetary gears journalled in said second mounting plate and meshing with said second sun gear and one of said rotatable ring gears formed integral with said second rotor, a third rotor rotatably mounted on said second shaft, a third sun gear rotatably mounted on said second shaft and formed integral with said third rotor, a stationary ring gear mounted on said housing disposed coaxially with said second shaft, a third plurality of planetary gear members having shafts journalled in said second mounting plate, meshing with said third sun gear and said stationary ring gear, second electromagnetic induction means disposed on said transmission in electromagnetic coupling relation with said third rotor, a fourth rotor rotatably mounted on said first shaft, a rotatable ring gear formed integral with said fourth rotor disposed coaxially with said second shaft, a fourth sun gear mounted on said second shaft, a fourth plurality of planetary gears having shafts journalled in said second rotor and said first shaft, meshing with said fourth sun gear and said rotatable ring gear formed integral with said fourth rotor, third electromagnetic induction means disposed on said transmission in electromagnetic coupling relation with said fourth rotor and means for supplying electrical current for said first, second and third electromagnetic induction means.

10. A transmission comprising a housing, a first shaft journalled in said housing, a second shaft journalled in said housing and said first shaft in axial alignment therewith, a first rotor rotatably mounted on said second shaft, a first sun gear rotatably mounted on said second shaft formed integral with said first rotor, a second rotor having a portion surrounding said first rotor rotatably mounted on said first shaft, a first electromagnetic induction means disposed on said second rotor in electromagnetic coupling relation with said first rotor, first and second ring gears mounted on said second rotor, disposed coaxially with said second shaft, a first mounting plate mounted on said second shaft, a first plurality of planetary gear members having shafts journalled in said first mounting plate, meshing with said first sun gear and said first ring gear, a second sun gear mounted on said second shaft, a second mounting plate rotatably mounted on said second shaft, a second plurality of planetary gears having shafts journalled in said second mounting plate, meshing with said second sun gear and said second ring gear, a third rotor rotatably mounted on said second shaft, a third sun gear mounted on said shaft and formed integral with said third rotor, a third ring gear mounted on said housing disposed coaxially with said second shaft, a third plurality of planetary gears having shafts journalled in said second mounting plate, meshing with said third sun gear and third ring gear, a second electromagnetic induction means disposed on said transmission in electromagnetic coupling relation with said third rotor, a fourth rotor rotatably mounted on said first shaft, a fourth ring gear disposed coaxially relative to said second shaft and formed integral with said fourth rotor, a fourth sun gear mounted on said second shaft, a fourth plurality of planetary gear members having shafts journalled in said rotor and said first shaft, meshing with said fourth sun gear and said fourth ring gear, third electromagnetic induction means disposed on said transmission in electromagnetic coupling relation with said fourth rotor, means for supplying electrical current for said first, second and third electromagnetic induction means, a lubricant reservoir means, means for transmitting lubricant from said reservoir means to said rotors and said gears, and means for pumping lubricant from said reservoir means through said lubricant transmitting means.

11. A transmission comprising a housing, a first shaft journalled in said housing, a second shaft journalled in said housing and said first shaft in axial alignment therewith, first, second, third and fourth planetary gear train systems each comprising a sun gear, a ring gear and a plurality of planetary gears, the sun gear of said first system being rotatably mounted on said second shaft and having a first rotor formed integral therewith rotatably mounted on said second shaft, the ring gear of said first system being disposed coaxially relative to said second shaft and having a second rotor formed integral therewith rotatably mounted on said second shaft, the ring gear of said first system being disposed coaxially relative to said second shaft and having a second rotor formed integral therewith rotatably mounted on said first shaft, electromagnetic induction means disposed on said second rotor in electromagnetic coupling relation with said first rotor, the planetary gears of said first system having shafts journalled in a mounting plate mounted on said second shaft for rotation therewith, the sun gear of said second system being mounted on said shaft for rotation therewith, the ring gear of said second system being disposed coaxially with said second shaft and formed integral with the ring gear of said first system for rotation therewith, the planetary gears of said second system having shafts journalled in a mounting plate rotatably mounted on said second shaft, the sun gear of said third system being rotatably mounted on said second shaft and having a third rotor formed integral therewith rotatably mounted on said second shaft, the ring gear of said third system being coaxially disposed relative to said second shaft and mounted on said housing, the planetary gears of said third system having shafts journalled in the same mounting plate as the planetary gears of said second system, second electromagnetic induction means mounted on said housing disposed in electromagnetic coupling relation with said third rotor, the sun gear of said fourth system being mounted on said second shaft for rotation therewith, the ring gear of said fourth system being disposed in coaxial alignment relative to said first shaft and having a fourth rotor formed integral therewith rotatably mounted on said first shaft, the planetary gears of said fourth system having shafts journalled in said second rotor and said first shaft, third electromagnetic induction means disposed on said housing in electromagnetic coupling relation with said fourth rotor and means for supplying electrical current for said first, second and third electromagnetic induction means.

12. A transmission comprising a housing, a first shaft journalled in said housing, a second shaft journalled in said housing and said first shaft in axial alignment therewith, a first cylindrical rotor rotatably mounted on said second shaft, a first sun gear rotatably mounted on said second shaft, formed integral with said first cylindrical rotor, a second rotor having a cylindrical portion surrounding said first cylindrical rotor rotatably mounted on said first shaft, first electromagnetic induction means disposed on the interior wall of said cylindrical portion of said second rotor in electromagnetic coupling relation with said first cylindrical rotor, first and second ring gears formed integral with said second rotor disposed coaxially with said second shaft, a first mounting plate mounted on said second shaft, a first plurality of planetary gears having shafts journalled in said first mounting plate, meshing with said first sun gear and said first ring gear, a second sun gear mounted on said second shaft, a second mounting plate rotatably mounted on said second shaft, a second plurality of planetary gears having shafts journalled in said second mounting plate, meshing with said second sun gear and said second ring gear, a third cylindrical rotor rotatably mounted on said second shaft, a third sun gear mounted on said shaft and formed integral with said third cylindrical rotor, a third ring gear mounted on said housing disposed coaxially with said second shaft, a third plurality of planetary gears journalled in said second mounting plate, meshing with said third sun gear and said third ring gear, second electromagnetic induction means disposed on said housing in electromagnetic coupling relation with said third cylindrical rotor, a fourth sun gear mounted on said second shaft, a fourth cylindrical rotor rotatably mounted on said first shaft, a fourth ring gear formed integral with said fourth cylindrical rotor disposed coaxially relative to said second shaft, a fourth plurality of planetary gears having shafts journalled in said second rotor and said first shaft, third electromagnetic induction means mounted on said housing disposed in electromagnetic coupling relation to said fourth cylindrical rotor, means for sensing the direction of rotation of said fourth circular rotor, means for supplying electrical current for said electromagnetic induction means, said housing having a lubricant reservoir compartment communicating with the interior thereof, said second mounting plate having an eccentric camming surface relative to the surface of said second shaft, said compartment having a pumping chamber, a plunger having a head portion slidably disposed in said pumping chamber and a stem portion extending through a suitable opening in said housing with the end thereof engageable with said cam surface on said second mounting plate, means disposed on said housing for biasing said stem portion of said plunger into engagement with said cam surface, said head portion of said plunger having a one-way flapper valve, said shafts having passageways intercommunicating with said rotors and said gears and said transmission having fluid supply means interconnecting with said pump chamber and said passageways in said shafts.

No references cited.

DON A. WAITE, *Primary Examiner.*